Patented June 22, 1954

2,681,704

UNITED STATES PATENT OFFICE 2,681,704

TREATING WELLS WITH A SUBSTRATE

Paul L. Menaul, Tulsa, Okla.

No Drawing. Application January 2, 1951,
Serial No. 204,083

7 Claims. (Cl. 166—22)

This invention pertains to the treatment of formations penetrated by a well to increase the productivity thereof. More particularly, this invention pertains to an improved method of and composition for fracturing such formations.

In the art of completing wells by applying a high hydraulic pressure to a gelled liquid and fracturing the formations penetrated by the well, various so-called "low-penetrating" liquids have been used. Both water-base and oil-base gels have been injected into formations and have satisfactorily produced fractures which extend substantial distances back into the formations. As these fractures are extended into the formations, the gels follow the fractures and, being viscous, the gels plug not only the fracture but the permeable zone adjacent to the fracture.

Various means have been proposed for removing the gel from the formation fractures produced by the gel and from the adjacent permeable zones; and, many failures of such fractures to increase the productivity of a formation are attributable to the inability to remove the gel from the fracture and the permeable zones contiguous thereto.

It is an object of this invention to provide an improved method of completing wells. Another object of this invention is to provide a method of producing, in a formation, a fracture which is highly permeable. Another object of this invention is to provide an improved gel for plugging permeable pores in a formation. Still another object of this invention is to provide a composition of matter which may be injected into a formation at high pressure to produce a fracture and which may then be removed from the fracture and from the formations penetrated by the fracture, so that the fluids in the formation may flow freely from the formations through the fracture.

In the present invention, a viscous liquid or gel is injected into a formation at high pressure, creating a fracture, and the viscous liquid is converted to a substantially less viscous liquid, so that it may be removed from the formation with the connate fluids of the formation. A viscosity reducer or gel breaker which is unaffected by ordinary formation temperatures and pressures and which acts in the presence of acids and bases and which is otherwise effective under all normal well conditions is used to reduce the gel so that it will flow freely from the fracture and from the formation.

The gel may be a viscous solution of any substrate, such as starch, water-soluble gums, protein, pectin, esters, or the like. By a viscous solution is meant a solution which will not penetrate readily into the pores of the rock that produces valuable fluids, such as oil, water, gas, or the like. Preferably, a low-penetrating gel is defined as a liquid which, with respect to the valuable fluids in the rocks, has a considerably retarded tendency to filter through the formations. Gels which, for example, have a substantially greater viscosity than the water or oil found in the rocks where a fracture is produced or which tend to plaster or produce a filter cake on permeable formations are low-penetrating gels. Gels having a viscosity greater than about 100 centipoises at room temperature are therefore low-penetrating gels; but, I prefer a viscosity of about 250 to 1,000 centipoises or greater.

This low-penetrating gel is produced preferably at the well head by dispersing the substrate in a suitable liquid. The substrate may be mixed with the liquid in a tank, and the solution then pumped into the well. Alternatively, the liquid may be pumped or flowed into the well, and the substrate, in a dry or liquid condition, added to the liquid as the liquid enters the well. In some cases, the liquid may be heated before or after the substrate is added to promote gelation.

An enzyme gel breaker is injected into the gel, subsequently to reduce its viscosity, so that the gel can be removed from a formation. This enzyme, which is specific for a particular substrate in the gel, may be incorporated in the gel before the gel is injected into the well; preferably, it is mixed with the liquid simultaneously with the mixing of the substrate.

The gel is injected into the well and spotted in the well at the level of the formation which is to be fractured. Packers may be used to isolate and confine a zone in the well in which the fracture is to be produced. When gelation has proceeded sufficiently so that the substrate is substantially completely reacted or dispersed and the gel has a suitable viscosity, the gel is injected into the formation. Injection is accomplished by applying, either directly or indirectly, to the gel a pressure great enough to cause the formation to part or fracture. This pressure, hereinafter referred to as the formation breakdown pressure, is, in general, very high and is, roughly, equal to the sum of the pressure required to overcome the rock-bonding strength and the pressure required to lift the effective overburden. In any case, in accordance with this invention, it is necessary to apply, at the elevation of the fracture, a pressure equal to or greater than the formation breakdown pressure, and such a pressure is readily recognized. It has been found, in this respect, that, when pressure is applied to the formation as above described, the pressure in the well builds up as the gel is pumped at substantially constant rate into the well. Eventually, the pressure drops rather abruptly in an amount substantially equal to the pressure required to overcome the rock-bonding strength and assumes a substantially constant value. The pressure drop indicates that the formation breakdown pressure has been reached. Inasmuch as the pressure required to overcome the rock-bonding strength is small at great depths in comparison to the pressure required to lift the effective overburden, the pressure drop may be small when the formation breakdown pressure is reached. The formation breakdown pressure is therefore more accurately defined and easily recognized as the pressure at which an increase in rate of fluid injection into the well will not materially increase the fluid pressure at the bottom of the well.

Any amount of the low-penetrating gel may be injected into the fracture, depending upon the depth of fracture desired. Generally, from 100 to 1,000 gallons or more of the gel are injected into the fracture—the gel being displaced from the well by water, oil, or the like.

When, as above described, the gel, at the time it is injected into the fracture, contains the enzyme, the well is merely shut in when the gel is in place. It is kept shut in for several hours, for example, 10 hours or more, to permit the enzyme to hydrolize or otherwise react upon the substrate and reduce the viscosity of the gel. When the well is opened and produced, as by swabbing, pumping, flowing, or the like, the reduced gel, which, in general, has the same flow characteristics as the initial sol or liquid component of the gel, is removed from the well, leaving a fracture which, due to spalling of the formation, is generally many times more permeable than the original formation. While the well is preferably left closed in, as above described, following injection of the gel, it may be opened and flowed or swabbed immediately, without damaging the well. When the well is placed on production immediately, the gel may carry some of the spalled rocks or props out of the fracture into the well, and so this procedure is considered less desirable.

In some cases, it is desirable to increase the permeability of the formation further by placing hard spacers or props in the fracture. Such props are placed by incorporating in the gel, before or at the time the gel is placed in the well, solid granular particles, such as sand, metal, or wood balls, or the like. The size of props is not particularly critical, but the particles are, preferably, less than about 8-mesh and larger than about 100 mesh. Also, the quantity of props is not particularly critical, but the amount is preferably sufficient to support the effective overburden and not great enough to interfere with pumpability of the gel. Between about 1 and about 10 gallons of 20-mesh sand per barrel of gel are desirable. These props are carried with the gel into the fracture and there deposited and left as the gel is thinned by the enzyme and removed from the formation.

Since the action of the enzyme on the substrate is slow, the enzyme, as stated, is preferably added to the gel before the gel is introduced into the well. The same results can, however, sometimes be obtained by pumping the gel and a solution of the enzyme into the fracture at different times. For example, the gel may be displaced into the fratcure by pumping an enzyme in solution into the fracture behind the gel. The volume of the solution of enzyme is, in such case, preferably as great as or greater than the volume of gel injected into the fracture to insure that all of the substrate particles are contacted by an enzyme. In either case the concentration of the enzyme in the gel or the solution is not critical—the higher the enzyme concentration, the faster the breakdown of the gel. A concentration of 0.01 to 0.10% by weight of the gel appears to reduce most gels to substantially the viscosity of the initial sol in less than a day.

Examples of some of the substrates and enzymes which produce suitable gels for fracturing a formation, and which can be completely removed from the formation, are set out in the following table.

| Substrate | | Sol | Enzyme |
| --- | --- | --- | --- |
| Type | Example | | |
| Starch | Pregelatinized starch | Water | Amylase. |
| Water-soluble gums | Arabic | do | Luizym. |
| Protein | Gelatin | do | Pepsin. |
| Soluble cellulose | Pectin | do | Pectinase. |
| Oil-water emulsifying agent | Ester | Oil and water. | Esterase. |

A number of tests have been conducted with the various substrates and enzymes. As an example of the results obtained, 60 grams of starch and 0.5 gram of an α-amylase, amprosyme No. 200, manufactured by Wolf and Co., Passaic, N. J., were dispersed in one liter of water. The viscosity of the gel produced was greater than 2,000 centipoises. After 24 hours, the viscosity was 2 centipoises. A control gel containing the same amount of starch, without an enzyme, still had a viscosity greater than 2,000 centipoises after 24 hours. Other starch solutions of the same concentration but containing 0.5 gram/liter of α-amylase enzymes produced similar results. For example, Dextrinase and Diastase, both manufactured by Takamine Laboratory, Clifton, N. J., reduced the 2,000-centipoise-starch gel to 2.0 and 1.5 centipoises, respectively, in 24 hours. The starch substrate may be of the thin-boiling or pregelatinized type in which the enzyme can be added with the substrate to cold water. In the case of hot starches, the gel is preferably prepared, allowed to cool, and the enzyme dispersed in the cool gel. That is, while the enzyme can stand moderate temperatures such as are encountered in wells, very high temperatures appear to retard its action. A suitable starch gel may be prepared by stirring the dry starch powder into an alkaline solution, e. g., a 2–10% water solution of sodium hydroxide. Such a gel, when formed, is desirably substantially neutralized with an acid and the enzyme added to the neutral starch.

The water-soluble gums, such as gum arabic, are typical of a class of pentosans or $C_5$ sugar substrates which produce water gels that may be liquefied with an enzyme. Typical enzymes are the fungus enzyme luizym and the bacteria enzymes *Fusarium lini*, *Fusarium oxysporum*, *Fusarium graminearum*, and *Fusarium lycopersicie*. Gels produced from emulsions of oil and water are unstable, without an emulsifying agent, such as an ester, which is a substrate. Emulsifying esters generally consist of the reaction product of a fatty acid having between 10 and about 20 carbon atoms and an organic hydroxy compound, including alcohols and sugars. Examples are diglycol laurate and glycolipins. Such emulsion gels are prepared at the surface by passing the oil and water in the presence of the emulsifying ester through a homogenizer or the like. The gel-breaking enzyme, which, in such case, is an esterase, may be added at the same time. Typical esterases are pancreatic lipase and certain extracts from the castor bean. A suitable gel is produced by emulsifying preferably about equal parts of water and oil, such as crude oil, or a refined oil, such as diesel oil. To this oil and water is added sufficient emulsifying ester to produce a stable emulsion or gel and sufficient esterase to break the emulsion, in from about 4 to about 24 hours, to the viscosity of the non-emulsified components. Due to variations in products of the various manufacturers, it is generally desirable to make a small-scale test or pilot run on the various substrates and enzymes, particularly in the case of emulsion gels, to determine the most desirable concentrations.

These gels, as indicated above, are particularly adaptable to use in wells which produce valuable fluids, such as water or oil, since they can be removed from any pores or crevices into which they might penetrate. While specific reference has been made to fracturing formations with gels containing peptizing enzymes, these gels, due to the high viscosities which may be obtained and due to the fact that the enzymes, even in the presence of high hydrostatic pressures and reasonable temperatures, are not inactivated, may be used in other well treatments. In the process of acidizing calcareous formations, for example, where the formations contain both large and small flow channels or pores, it is desirable to plug the larger pores, so that the acid will be forced into the smaller pores. Gels of the class above described, containing enzymes, when pumped into a well under moderate pressure, appear to enter the larger pores selectively and plug them without plugging the smaller pores. Since the enzymes are not inactivated by bottom-hole temperatures and pressures and since they can withstand some contact with acid, the enzymes break the gel after several hours, so that the sol may be removed from the well and the pores may again produce.

From the foregoing it can be seen that this invention is capable of a great variety of embodiments. Such variations as fall within the scope of the appended claims should be construed to fall within the spirit and intent of the invention.

I claim:

1. A method of treating a formation penetrated by a well comprising introducing into said well a starch gel containing an amyloclastic enzyme, applying to said gel a pressure sufficient to force said gel into the pores of said formation, and producing said well.

2. A method of increasing the productivity of a formation penetrated by a well comprising introducing into said well a starch gel, applying to said gel a pressure as great as the formation breakdown pressure to fracture said formation and force said gel into said fracture, contacting said gel with an amyloclastic enzyme to reduce the viscosity of said gel, and producing said well.

3. A method of treating a formation penetrated by a well comprising introducing into said well a starch gel containing an amyloclastic enzyme, applying to said gel a pressure sufficient to force said gel into the larger pores of said formation, injecting acid into said well and applying pressure to said acid sufficient to force said acid into the small pores of said formation, and producing said well.

4. A method of increasing the productivity of a calcareous formation penetrated by a well comprising introducing into said well a gel containing water, starch, and $\alpha$ amylase, after said gel has reached a viscosity of about 100 centipoises or more applying a pressure to said gel sufficient to force said gel into the larger pores of said formation, thereafter injecting acid into the smaller pores of said formation to increase their permeability, allowing sufficient time for said $\alpha$ amylase to reduce the viscosity of said gel to substantially the viscosity of the connate fluids in said formation, and producing said well.

5. A method according to claim 4 in which said starch is pregelatinized starch.

6. In a method of treating a formation penetrated by a well the steps of introducing into said well an amyloclastic enzyme in a gel comprising a water solution of a water-soluble polysaccharide, said enzyme being capable of breaking said gel upon prolonged contact, applying to said gel a pressure sufficient to force said gel into said formation, and producing said well to remove the broken gel from said formation.

7. A method according to claim 6 in which said gel is a water solution of pregelatinized starch.

References Cited in the file of this patent

UNITED STATES PATENTS

| Number | Name | Date |
|---|---|---|
| 556,651 | Van Dyke | Mar. 17, 1896 |
| 1,444,250 | Kern et al. | Feb. 6, 1923 |
| 1,998,756 | Grebe et al. | Apr. 23, 1935 |
| 2,259,419 | Hefley et al. | Oct. 14, 1941 |
| 2,343,136 | Dobson et al. | Feb. 29, 1944 |
| 2,547,778 | Reistle, Jr. | Apr. 3, 1951 |

FOREIGN PATENTS

| Number | Country | Date |
|---|---|---|
| 465,111 | Great Britain | of 1937 |

OTHER REFERENCES

Tauber: Chemistry and Technology of Enzymes, 1949, pp. 396–401. Published by John Wiley & Sons, Inc., New York. (Copy in Scientific Library.)